United States Patent Office 3,480,466
Patented Nov. 25, 1969

3,480,466
RELEASE PAPER FOR DEBOSSING PLASTIC SHEETS
Robert A. Benson, Gorham, Maine, and Robert L. Jones, Gorham, N.H., assignors, by mesne assignments, to Scott Paper Company, Delaware County, Pa., a corporation of Pennsylvania
No Drawing. Filed Mar. 17, 1967, Ser. No. 623,823
Int. Cl. B44d 1/14, 1/16
U.S. Cl. 117—76          5 Claims

ABSTRACT OF THE DISCLOSURE

Disclosed is a release paper useful for embossing plastic sheets. The release paper consists of a conventional paper sheet base coated with a select aqueous clay-adhesive coating composition and top coated with a tough film of a resinous polymer. The top coating is known per se. The invention resides in the use of a base coating that has an internal cohesiveness that is less than its adhesiveness to the paper sheet or the top film coat, which is achieved by regulating the amount of adhesive binder used in the coating.

BACKGROUND OF THE INVENTION

Embossed plastic surfaces have been made by pressing an embossing roller or plate that has a hard raised pattern on its surface against the reverse side of a plastic sheet. Difficulty has been experienced in obtaining release between the embossing surface and the plastic. One method that has been used to overcome this problem has been the insertion of a release paper between the embossing surface and the plastic surface, the release paper usually having a specially treated surface for easy release from the plastic surface. See U.S. Patents Nos. 2,676,118, 2,772,141, 2,803,557 and 2,985,544.

Debossing is carried out in a manner similar to embossing except that the pattern is punched into the obverse side of the plastic sheet. Debossing subjects a release paper to a much more severe treatment. A matrix roll may be used in either embossing or debossing.

"Embossing" is used in this specification and claims to include both the above-described embossing and debossing procedures.

To be useful in embossing, a release paper must have the ability to stretch and conform to the embossing surface while maintaining a continuous release film in contact with the plastic surface that bridges over any breaks or cracks formed in the release paper, which occur because most paper webs used as a base sheet are not too extensible. Release papers that have been fairly satisfactory in this respect have been made by extruding a tough polyolefin film, e.g., polyethylene or polypropylene, on to a suitable paper web. Such release papers are relatively expensive, and the polyolefin films release well only from a limited number of plastics. Also, the gloss of such release papers cannot be varied significantly.

The present invention is an embossing release paper having the desired property of conformability during the embossing without the formation of breaks or other discontinuities in its forming surface, but is one that is made by conventional paper forming and coating techniques such that it is relatively inexpensive.

SUMMARY OF THE INVENTION

In brief compass, the present invention is a debossing release paper comprising a paper base sheet, a pigmented base coating thereover masking the irregularities in the surface of the base sheet, and a stretchable and flexible film coating over the base coating, the base coating having an internal cohesiveness that is substantially less than its adhesiveness to either the paper base or the film coating.

The base coating composition is aqueous and consists essentially of a paper-coating-grade mineral pigment and a conventional water-dispersable paper-coating-grade adhesive binder thereof, with however, the ratio of binder to pigment used being much less than that used in conventional coating compositions. The base coating is applied by conventional techniques, e.g., by a doctor blade or air knife coater. It can be calendered before the application of the film coating, although this not mandatory.

The film coating is laid down from either a solvent-based or water-based coating composition consisting essentially of an unpigmented solution or dispersion of a resinous polymer which upon drying consolidates and forms a tough continuous film over the base coating. Such film coating compositions are known per se. Suitable release agents can be incorporated into the film coating composition to give the desired release properties or the film coating, after drying, can have a coating or film of the release agent applied to it. Preferably, the film coating composition when cast by itself on a glass plate and air dried to form a film at least 0.010 mil thick has a tensile strength of at least 7500 p.s.i. and an elongation at break of at least 250%.

The construction of the present release paper is such that the pigmented base coating between the film coating and the base sheet splits or shears during embossing which allows the film coating to stretch, flow and otherwise conform to the desired pattern independently of the movement of the paper base sheet. Usually, the paper base sheet will crack or rupture, but the film coating bridges such discontinuities and the plastic surface being embossed "sees" only a continuous surface.

Thus, the present invention is characterized by the particular base coating used intermediate the paper base sheet and the continuous film coating. The desired weak internal cohesiveness is obtained primarily by regulating the ratio of adhesive binder to pigment in the base coating.

Most coating colors, say those used for letterpress printing papers, are far too strong for use as base coatings in the present invention. Whereas, a minimum of about 16 parts of casein are used per 100 parts by weight of pigment in most coating compositions, only 3 to 8 parts by weight are used in this invention. Various adhesives do, of course, vary in their relative bonding strengths and for this reason, the bonding strength of an adhesive binder will be referred to in terms of its "casein equivalent." For example, soybean flour is only half as effective as caesin (cf. Patent No. 2,676,118, col. 2, lines 46–52), so that twice the amount, or up to 16 weight percent will be used. Latics of the butadiene styrene type are usually about equal in bonding strength to casein, so that 8 percent (dry basis) would be equivalent to 8 pounds of casein, per 100 parts of pigment.

The Sisalkraft-Scott Internal Bond Tester, Model B (Scott Testers, Inc., Providence, R.I.) can be used to test the bonding strength of the base coating. In this test a one inch by one inch sample of the paper is solidly adhered to an anchored anvil and to a 90° aluminum angle by means of two-sided Scotch Tape. A falling pendulum strikes the inner face of the upright leg of the angle and rips it away, causing the sample to split in the coating. The force required to do this is recorded in fractional foot-pounds. Base coatings giving values in the order of 0.02 to 0.10 foot-pound have been found to be satisfactory for this invention. Letterpress printing papers normally have coatings that give values in excess of 0.20 foot-pound by this test.

The level of the adhesive used in the base coat cannot be reduced too far, not only because the coating may become too weak to stick to the paper base, but also because the coating may become too absorptive such that the top coating composition will penetrate and strengthen it in such a manner that it will not split readily.

A fairly heavy application of the base coat is preferred, usually 10 to 25 pounds dry weight per ream (3,300 sq. ft.).

No great strength is required in the paper base sheet, ream weights in the order of 30 to 80, 40 to 60 preferably, pounds being satisfactory. Preferably the stock is only lightly beaten so that the paper will have a fairly even or uniform formation and be fairly porous.

Examples

The base sheet is a bodystock customarily used for letterpress papers and has a ream weight of 50 pounds. It consists of about equal parts of lightly beaten bleached wood fibres from coniferous and deciduous trees. Its Gurley Densometer value is about 25 seconds.

The base coating is applied in an amount of 17 pounds (dry weight) per ream on the wire side of the base sheet by an air knife coater and is force-dried to prevent undue absorption into the paper base. The base coating formulation is: (Formula #1).

| | Dry weight |
|---|---|
| English coating clay | lbs 100 |
| Butadiene-styrene latex at 50% solids (Dow Chemical's 512-R) | lbs 5 |
| Calcium stearate | lbs 1 |
| Defoamer (Imperial Chemical Industries' Siotol 124) | oz 8 |
| Dye (Du Pont's Rhodamine 6 GDN) | oz ¼ |
| Water for 45% solids. | |

The amount of latex used is about one-half that required to give a coating suitable for letterpress printing. The dye is used simply to help the operator see which side is coated, and the calcuim stearate is used as a lubricant to allow slip of the film coat and to minimize penetration of the film coat into the base coat. The base coat is not calendered.

The film coat is applied by an air-knife coater in an amount of 6 pounds per ream and has the following formulation:

| | |
|---|---|
| Polyvinyl alcohol (Air Reduction's Vinol 125 at 9% solids) | lbs 100 |
| Tri-butyl phosphate | oz 9.5 |
| Water for 8.5% solids. | |

The film coat is force-dried and then an extremely thin release coating of the following composition is applied as a wash coat on an air-knife coater:

| | Dry weight, lbs. |
|---|---|
| Water | 1,900 |
| Quilon (Du Pont's stearata-chromic chloride) | 300 |
| Buffer (235 lbs. water; 60 lbs. urea; 15 lbs. sodium formate; 100 oz. formic acid) | 300 |

This release paper is evaluated as follows: a 10½ by 10½ inch specimen debossing plate is used that has a pattern engraved in it to a depth at the lowest points of about 0.030 inches. This plate is preheated to 320° F. and placed in a 12 by 12 inch platen press, is also preheated. The release paper is placed on the plate and 3 grams per sq. in. of a vinyl (polyvinyl chloride) crumb (Armstrong Cork Company's vinyl fine mix) is spread over it, and a 0.05 inch thick felt is placed on top. The top platen is lowered with minimum pressure and the layup is preheated for 30 seconds, with the platen temperature being 320° F. Following this, the layup is compressed at 1,000 pounds per square inch for one minute, the pressure is released and the debossed laminate is removed while hot.

It will be found that the release sheet peels readily from the debossed plastic surface and while there are numerous cracks apparent in the paper body stock of the release paper, its film coat remains unbroken and no corresponding cracks are apparent in the debossed plastic surface. The detail of the debossed surface will be found to be excellent.

Other base-coat formulations that can be used are:

DRY WEIGHTS

| Formula | #2 | #3 | #4 |
|---|---|---|---|
| Clay (lbs.) | 100 | 100 | 100 |
| Casein (dissolved by ammonia) (lbs.) | 6 | | |
| Oxidized Starch (lbs.) | | 8 | |
| Soybean flour (lbs.) | | | 15 |
| Dimethyol Urea (lbs.) | 0.5 | 2 | |
| Caustic Soda (lbs.) | | | 0.75 |
| Anti-foamant (Sistol 124) (ounces) | 8 | | |
| Tributyl Phosphate (lbs.) | | | 0.5 |
| Water for solids, percent | 45 | 45 | 45 |

Vinol 125 and low viscosity soy protein, in both instances 5 pounds dry per 100 parts clay, have been substituted for the Dow Latex 512-R of Formula #1 with satisfactory results.

The polyvinyl alcohol used in the film coat can be replaced with a polyvinyl pyrollidone (General Aniline and Film Corporation's PVP-NP-K90 applied at 10 percent solids) and also with a polyvinylidine chloride (Dow Chemical's Saran 220 applied at 20 percent solids in MEK) if application from a solvent system is desired. Poor results have been obtained with some polyurethanes (Wyandotte's E-411 and B. F. Goodrich's Estane 5740X150), styrenebutadiene latexes (Dow's 512-R), acrylics (Rohm and Haas' Rhoplex AC-34), carboxylated vinyl ethers (General Aniline's Gantrez AN-139), vinyl chloride, vinyl acetate copolymers (B. F. Goodrich's Geon 440X24), alkyd resins (Rohm and Haas' Duraplex ND-77B), and polyesters (Goodyear's Vitel PE-200) when they were used for the film coat because of poor release, penetration of the base coating and/or thermoplasticity in use.

If a release coat is separately applied over the film coat, it is preferred to use one that is thermosetting (curable). Any good release coat can be used. The release coat as such is not part of this invention. "Quilon" (stearato-chromic chloride) either alone (U.S. 2,772,141) or with a film-forming binder (U.S. 2,803,557) is satisfactory. The silicones (U.S. 2,985,544) are also useful.

Having described this invention, what is sought to be protected by Letters Patent is succinctly set forth in the following claims:

We claim:
1. An embossing release paper for forming an embossed plastic surface, comprising a paper base sheet, a base coating thereon masking the irregularities in the surface of said base sheet, said base coating containing a paper-coating-grade mineral pigment and a water dispersable paper-coating-grade adhesive binder with said binder being present in an amount in the range of from 3 to 8 pounds, inclusive (casein equivalent) per 100 pounds of said pigment, and a stretchable and flexible film coating selected from the group consisting of polyvinyl alcohols, polyvinyl pyrrolidones and polyvinylidene chlorides overlaying said base coating and providing a release surface, the internal cohesion of said base coating being substantially less than its adhesion to said base sheet and to said film coating.

2. The release paper of claim 1 wherein the paper base sheet is a lightly beaten sheet having a ream (3,300 sq. ft.) weight in the range of 30 to 80 pounds, and the weight of said base coating being in the range of 10 to 25 pounds per ream (dry basis).

3. The release paper of claim 1 wherein said film coating is unpigmented and is present in the amount in the range of from 4 to 10 pounds per ream (dry basis).

4. The release paper of claim 1 wherein said film coating has applied thereto a thin release coating.

5. The release paper of claim 1 wherein said base coating splits under a force in the range of 0.02 to 0.10 foot-pound as determined by the Sisalkraft-Scott Internal Bond Tester, Model B.

References Cited

UNITED STATES PATENTS

| | | | |
|---|---|---|---|
| 2,083,441 | 6/1937 | Frost | 117—86 |
| 2,333,023 | 10/1943 | Manor. | |
| 2,676,118 | 10/1954 | Thomas | 117—82 |
| 2,772,141 | 11/1956 | Dunlap | 264—338 |
| 2,803,557 | 8/1957 | Martin et al. | 106—194 |
| 2,985,544 | 5/1961 | De Monterey et al. | |

WILLIAM D. MARTIN, Primary Examiner

R. HUSACK, Assistant Examiner

U.S. Cl. X.R.

117—11, 83, 86